United States Patent
Hui et al.

(10) Patent No.: US 9,628,371 B2
(45) Date of Patent: Apr. 18, 2017

(54) CONTROLLING ROUTING DURING SCHEDULED NODE DOWNTIME

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 13/868,290

(22) Filed: Apr. 23, 2013

(65) Prior Publication Data

US 2014/0314096 A1    Oct. 23, 2014

(51) Int. Cl.
*H04L 12/28*  (2006.01)
*H04L 12/707*  (2013.01)
*H04L 12/703*  (2013.01)

(52) U.S. Cl.
CPC .............. *H04L 45/22* (2013.01); *H04L 45/28* (2013.01)

(58) Field of Classification Search
CPC ......... H04L 45/22; H04L 45/00; H04L 45/28; H04L 45/12; H04L 45/128
USPC ........................................................ 370/400
See application file for complete search history.

(56) References Cited

U.S. PATENT DOCUMENTS

| | | | |
|---|---|---|---|
| 6,510,219 B1* | 1/2003 | Wellard | H04L 41/5025 370/354 |
| 7,355,983 B2* | 4/2008 | Scudder | H04L 45/02 370/216 |
| 7,453,824 B1* | 11/2008 | Nucci | H04J 14/0227 370/254 |
| 7,496,659 B1 | 2/2009 | Coverdill et al. | |
| 7,792,991 B2 | 9/2010 | Shand | |
| 7,839,767 B2 | 11/2010 | Vasseur | |
| 8,077,712 B2 | 12/2011 | Evans | |
| 8,243,604 B2 | 8/2012 | Kothari et al. | |
| 8,259,584 B2 | 9/2012 | Vasseur et al. | |
| 8,284,758 B2 | 10/2012 | Shah et al. | |
| 8,320,361 B2 | 11/2012 | Mohapatra et al. | |
| 2004/0071090 A1* | 4/2004 | Corson | G06F 11/0709 370/244 |
| 2006/0087963 A1* | 4/2006 | Jain | H04L 49/552 370/217 |

(Continued)

OTHER PUBLICATIONS

Decraene et al "Requirements for the Graceful Shutdown of BGP Sessions", Request for Comments: 6198, Apr. 2011, Internet Engineering Task Force (IETF).*

(Continued)

*Primary Examiner* — Yemane Mesfin
*Assistant Examiner* — Abdelillah Elmejjarmi
(74) *Attorney, Agent, or Firm* — Parker Ibrahim & Berg LLC; James M. Behmke; Stephen D. LeBarron

(57) ABSTRACT

In one embodiment, a first node in a shared-media communication network may receive a message indicated a scheduled downtime of a second node located between the first node and a destination. The first node may determine whether to perform a search for an alternate route toward the destination. In response to determining to perform the search, the first node may perform the search for an alternate route toward the destination for use at least during the scheduled downtime.

20 Claims, 9 Drawing Sheets

(56) References Cited

U.S. PATENT DOCUMENTS

2009/0100193 A1 4/2009 Natarajhan et al.
2009/0136234 A1 5/2009 Mottahedin
2012/0320753 A1 12/2012 Vasseur et al.

OTHER PUBLICATIONS

Gnawali, et al., "The Minimum Rank with Hysteresis Objective Function", Request for Comments 6719, Sep. 2012, 13 pages, Internet Engineering Task Force Trust.
Thubert, P., "Objective Function Zero for the Routing Protocol for Low-Power and Lossy Networks (RPL)", Request for Comments 6552, Mar. 2012, 14 pages, Internet Engineering Task Force Trust.
Vasseur, et al., "Routing Metrics Used for Path Calculation in Low-Power and Lossy Networks", Request for Comments 6551, Mar. 2012, 30 pages, Internet Engineering Task Force Trust.
Winter; et al., "RPL: IPv6 Routing Protocol for Low-Power and Lossy Networks", Request for Comments 6550, Mar. 2012, 157 pages, Internet Engineering Task Force.

\* cited by examiner

CONTROLLING ROUTING DURING SCHEDULED NODE DOWNTIME

TECHNICAL FIELD

The present disclosure relates generally to computer networks, and, more particularly, to controlling routing during a scheduled downtime.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Furthermore, the traffic routing on the DAG is often directed to (or from) a Field Area Router (FAR) in the LLN, where the FAR in turn may direct traffic over a backhaul link, e.g., to a management system. When a FAR experiences a connectivity failure, for example, due to a planned maintenance (e.g., performing a firmware upgrade, planned power outage, etc.) or a malfunction (e.g., unexpected power outage, recovering from a run-time exception, a watchdog reset, etc.) disruption occurs in the routing topology while devices in the routing topology search for alternate available paths to reach the FAR, and rebuilding of the LLN topology may be time consuming.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first node in a shared-media communication network may receive a message indicating a scheduled downtime of a second node located between the first node and a destination. The first node may then determine whether to perform a search for an alternate route toward the destination. In response to determining to perform the search, the first node may search for an alternate route toward the destination for use at least during the scheduled downtime.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
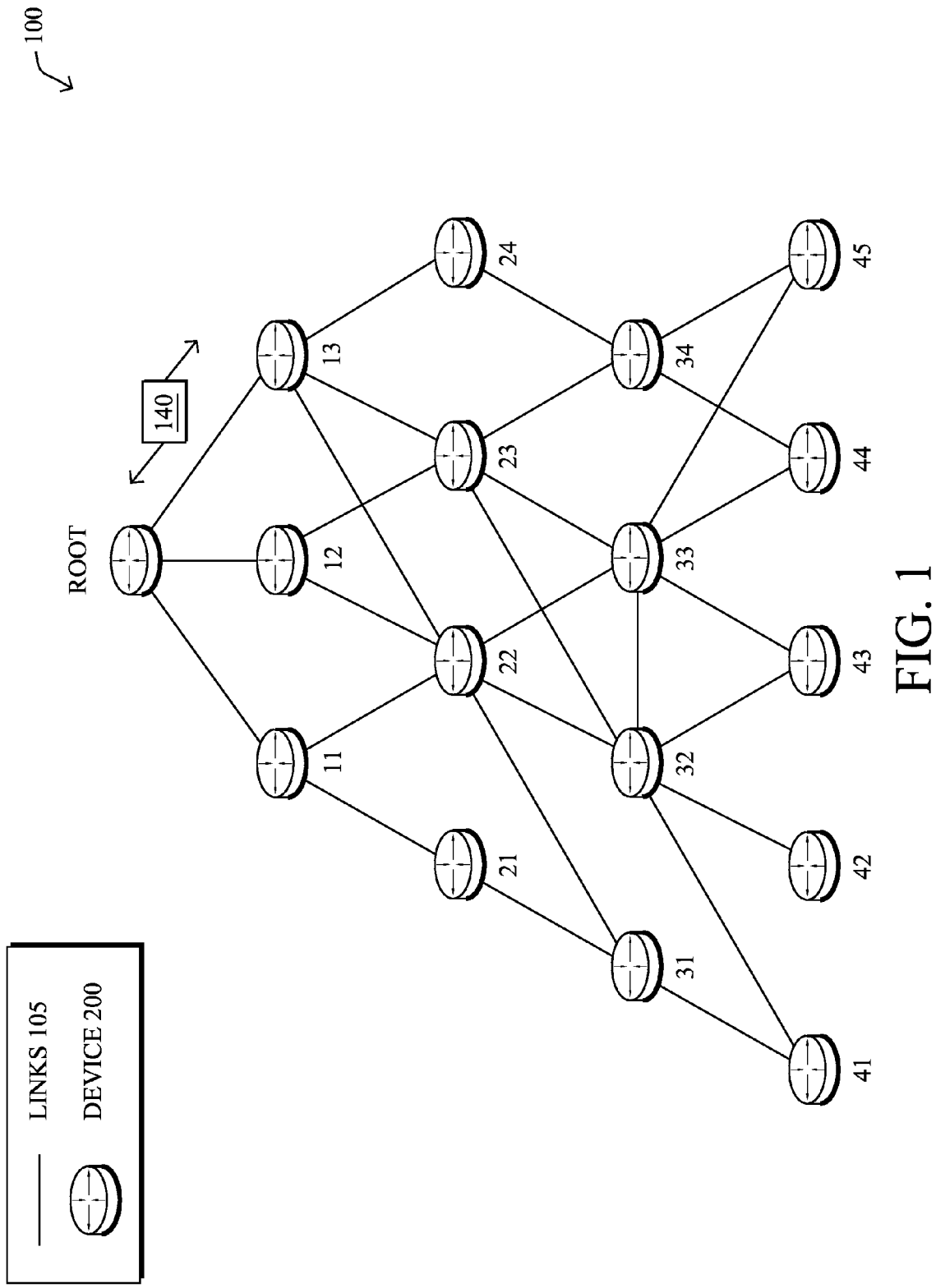
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node (e.g., field area router, FAR), the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
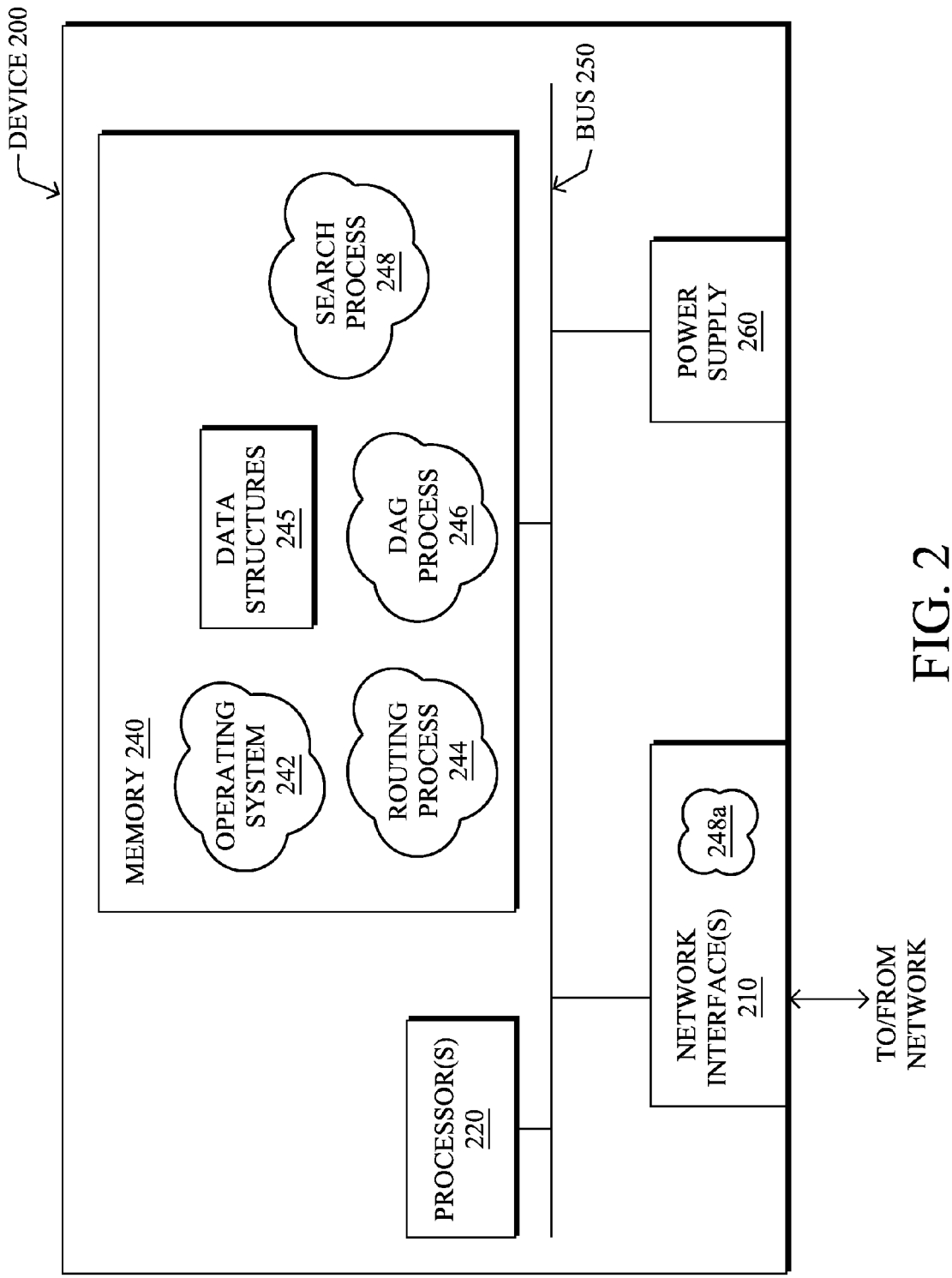
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative search process 248, as described herein. Note that while search process 248 is shown in centralized memory 240, alternative embodiments provide for the process (or portions of the process) to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL (Routing Protocol) also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

As noted above, traffic in a shared-media communication network is generally routed to/from a FAR and when the FAR schedules a downtime, disruption in the routing topology may occur. Certain methods have been proposed to control routing during a scheduled downtime, but such methods require devices to hold all transmissions during the scheduled downtime.

Dynamic Routing Control During a Scheduled Downtime

The techniques herein provide a method for controlling a routing topology during a scheduled downtime to minimize disruption during the downtime. For instance, a first node may be notified of the scheduled downtime and may determine whether to search for an alternate route or hold transmissions during the downtime. When searching for the alternate route, the first node may utilize a plurality of searching techniques to minimize the routing disruption during the scheduled downtime.

Specifically, according to one or more embodiments of the disclosure as described in detail below, a first node in a shared-media communication network may receive a message indicating a scheduled downtime of a second node located between the first node and a destination. The first node may then determine whether to perform a search for an alternate route toward the destination. In response to determining to perform the search, the first node may search for an alternate route toward the destination for use at least during the scheduled downtime. In addition, the first node may advertise the scheduled downtime message to neighboring nodes in the shared-media communication network (e.g., which may propagate the message further into the network), to trigger the neighboring nodes to determine whether to search for an alternate route.

Illustratively, the techniques described herein may be performed by hardware, software, and/or firmware, such as in accordance with the illustrative search process 248/248a, which may contain computer executable instructions executed by the processor 220 (or independent processor of interfaces 210) to perform functions relating to the techniques described herein, e.g., in conjunction with (or as an integrated part of) routing process 244 and/or DAG process 246. For example, the techniques herein may be treated as extensions to conventional protocols, such as the various routing protocols (e.g., RPL), and as such, may be processed by similar components understood in the art that execute those protocols, accordingly.

Operationally, the techniques herein generally relate to controlling routing during a scheduled downtime to prevent disruption in the routing topology caused during the downtime. In particular, as mentioned above, a first node notified of a scheduled downtime of a second node may determine whether to search for an alternate route toward a destination. When the first node determines to perform the search, the first node may utilize a plurality of searching techniques that vary according to a degree of disruption. Alternatively, the first node may determine to not perform the search and may hold transmissions during the scheduled downtime. Also, as described herein, the first node may optionally advertise the downtime message to neighboring nodes to trigger the neighboring nodes to determine whether to search for an alternate route.

Figure 3:
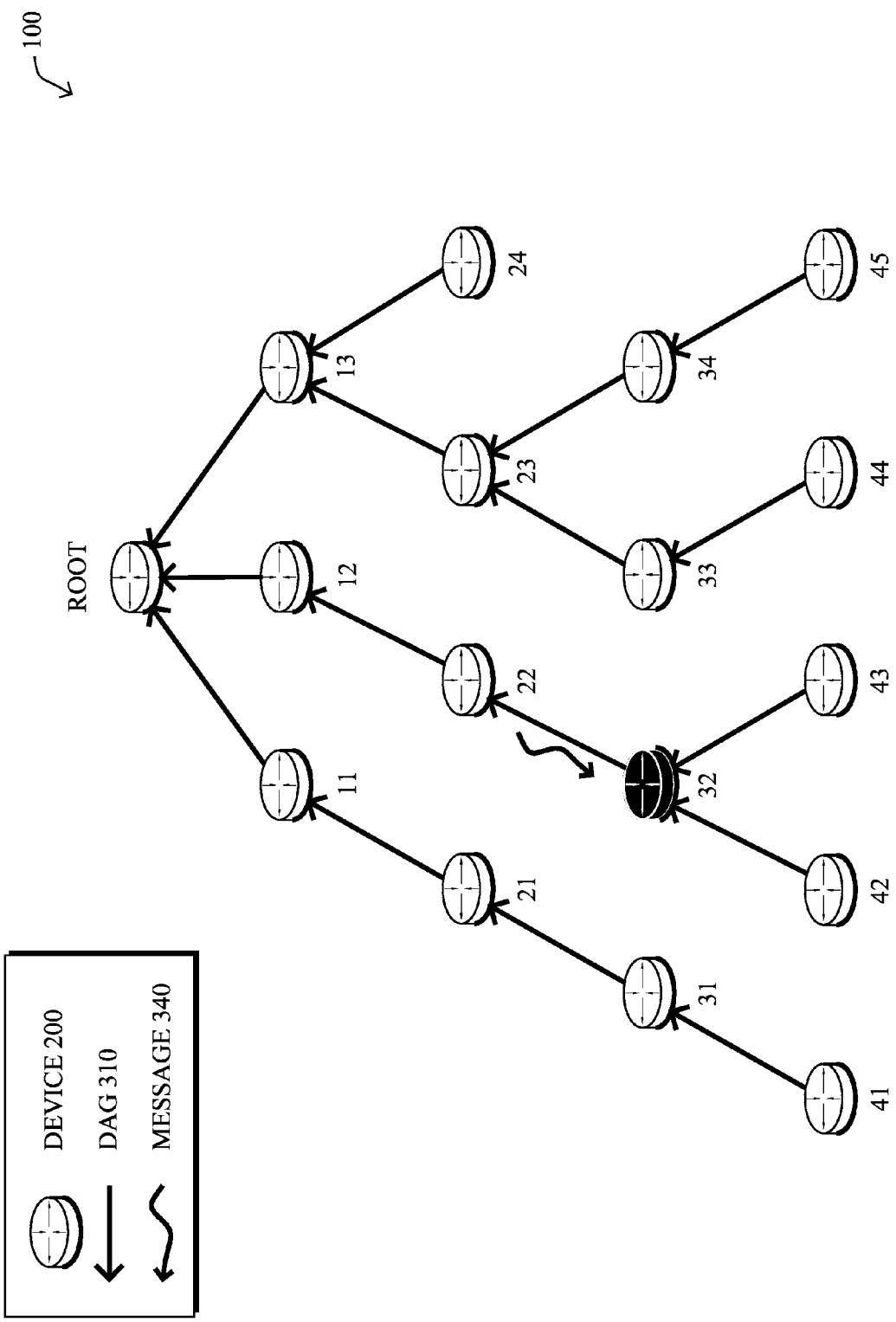
FIG. 3 illustrates an example view of transmission of a scheduled downtime message.

Notably, FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310, which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

In one embodiment, as illustrated within FIG. 3, a first node (e.g., node 32) may receive a message 340 indicating a scheduled downtime of a second node (e.g., the parent node 22) located between the first node and a destination (e.g., the root/FAR). Note that the message may generally indicate downtime of a root node of the DAG (e.g., FAR) or a parent node of the first node in the DAG (e.g., node 22). However, the indicated downtime node may or may not be a root node or a parent node, and may be a topologically subordinate node in the DAG (e.g., nodes 42 and 43), or may be other neighbors, siblings, or other nodes within the network 100. In addition, the message may be originated by the downtime node (e.g., node 22 in the example), or may be generated by another node with knowledge of the downtime, such as the root node, a FAR, a network management server (NMS), or other management device.

Figure 4:
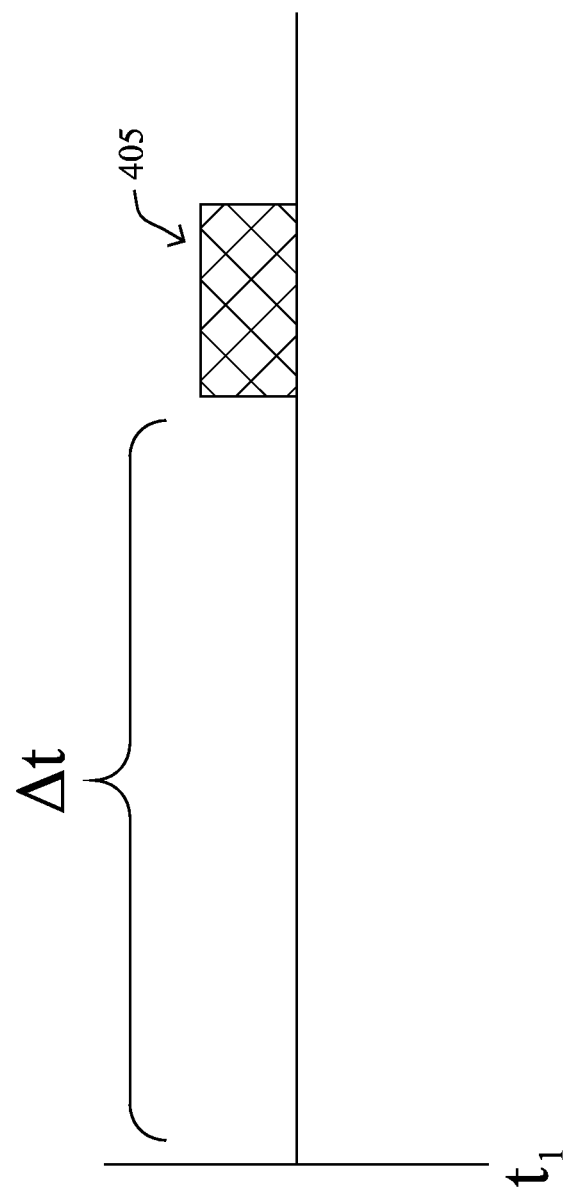
FIG. 4 illustrates an example view of timing of a scheduled downtime.

Once the first node has received the message indicating the scheduled downtime of the second node (e.g., the parent node), the first node may determine whether to perform a search for an alternate route toward a destination (e.g., a node located beyond the parent, such as the root). The determination of whether to perform the search may be based on one or more of a time of the scheduled downtime, a duration of the scheduled downtime, and a time when the message 340 was received and/or originated. For instance, as shown in FIG. 4, the message may be received at time $t_1$ and $\Delta t$ may be the time until the scheduled downtime 405 of the second node. Specifically, the message 340 may contain information regarding the time of the scheduled downtime such as an absolute time (coordinated universal time) and a relative time (e.g., from a time when the message was originated). In addition, the message may include information regarding the duration of the scheduled downtime, that is, how long the downtime is expected to occur, which may be computed using historical data and other heuristics. Thus, the first nodes may determine whether to perform a search and whether to restore the existing network topology after a temporary switch to an alternate route based on the time included in the message.

Illustratively, the first node may determine not to perform the search for an alternate node when the first node determines that the duration of the scheduled downtime is less than a predetermined amount of time or is at a time that otherwise does not interfere with operation of the first node (e.g., when the first node expects to not have any transmissions toward the destination). In that case, the first node may determine to hold transmission of messages (e.g., buffer messages) during the scheduled downtime. For example, the first node may initially analyze the time included in the message to determine whether the duration of the scheduled downtime is less than a predetermined amount of time. If so, then the first node may decide to hold message transmissions instead of searching for an alternate route. For example, the first node may hold transmission of messages that are non-critical and are therefore not affected by the disruption in the routing topology.

Figure 5:
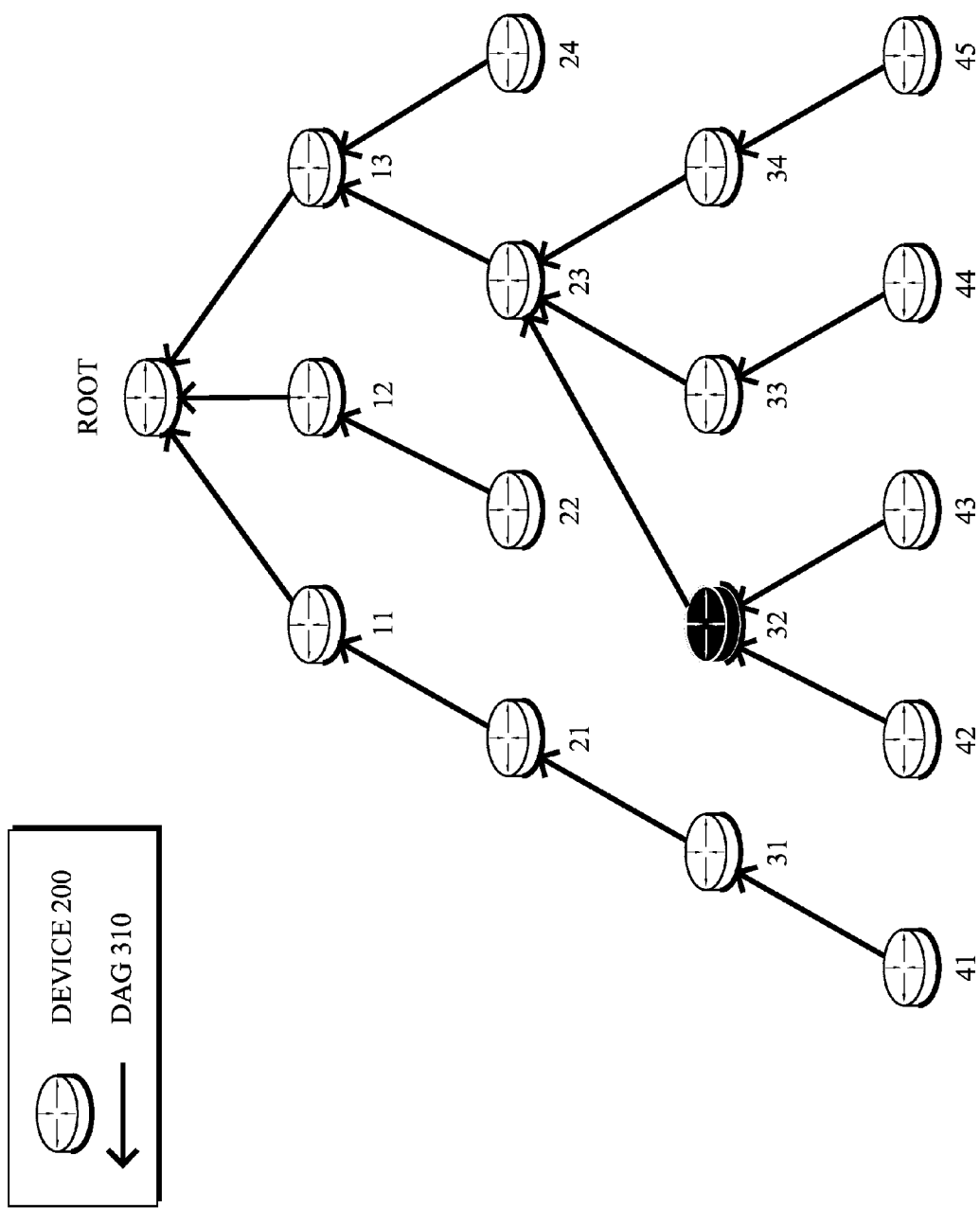
FIGS. 5-6 illustrate example views of detecting an alternate route.

According to one or more embodiments herein, when the first node determines to perform the search for an alternate route, the first node may utilize a variety of searching techniques, illustratively where the technique(s) chosen may vary according to a level of disruption to the routing topology. For instance, as illustrated in FIG. 5, a node learning of the scheduled downtime may use (search for) a precalculated alternate route. That is, the first node may switch to an alternate route with minimal disruption to the routing topology since the alternate route is one that is already known to the first node. For example, as illustrated, node 32 may detect a precalculated alternate route toward the root node (or toward another destination), and may transmit to node 23 (e.g., an alternate/backup parent node) instead of node 22 during (or in advance of) the scheduled downtime. Notably, in one or more embodiments herein, when the first node does not detect a precalculated alternate route, the first node may trigger a routing control message by sending, for example, a RPL DIS (Destination Orientated DAG Information Solicitation) message, to search for a newly computed alternate route. In this manner, the first node may detect an alternate route within the DAG 310 in which the first node already participates.

Figure 6:
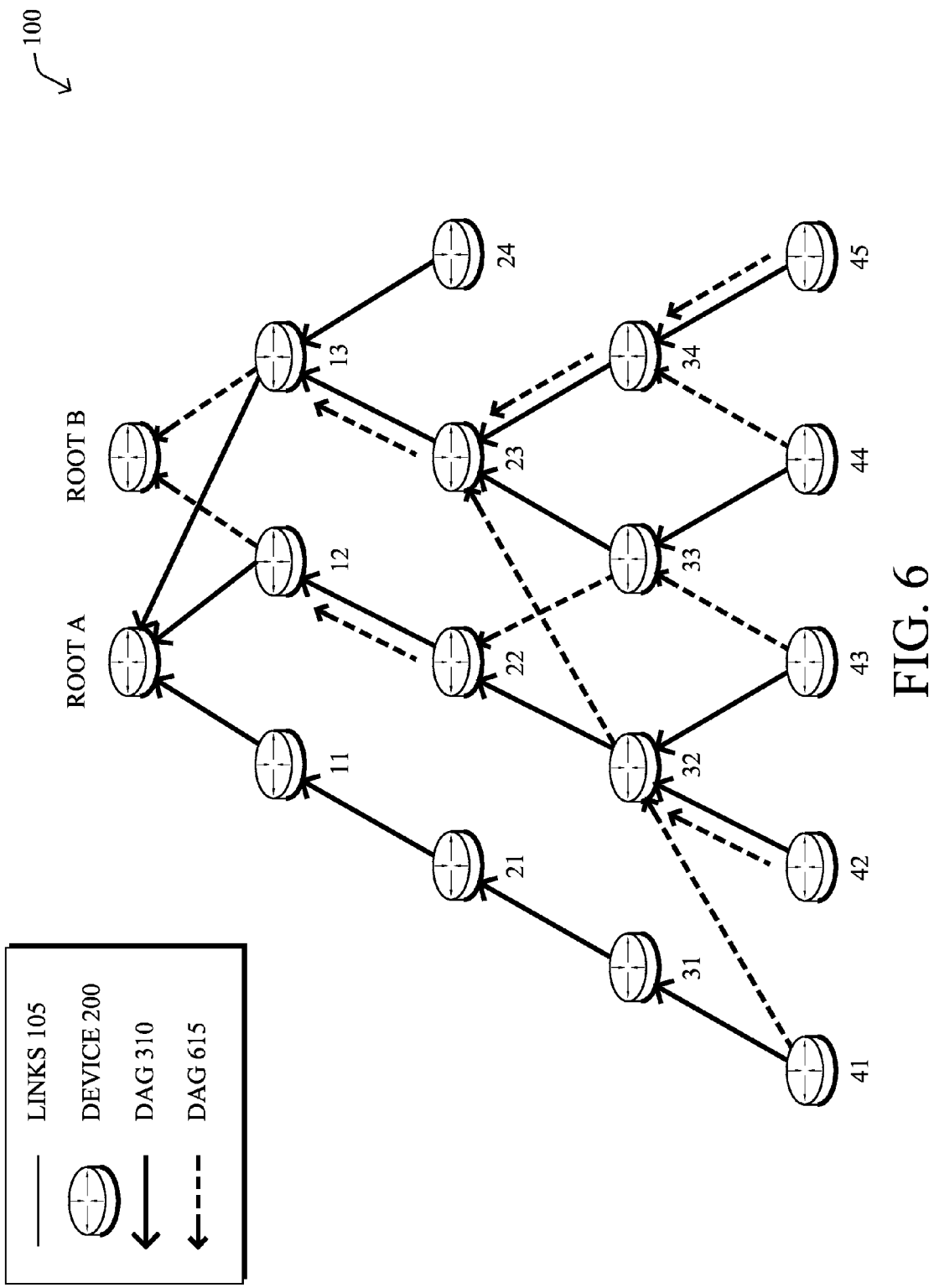

Alternatively or in addition (e.g., in response to no alternate routes within the DAG 310), as illustrated in FIG. 6, the first node may also search for a route within an alternate DAG 615 in which the first node already participates. In other words, the first node may search to determine whether the first node already participates in an alternate DAG 615 that may be utilized during the scheduled downtime. For example, as shown in FIG. 6, node 32 may already participate in a DAG 310 directed toward ROOT A (via parent node 22) as well as an alternate DAG 615 directed towards ROOT B (via parent node 23), where both DAG 310 and DAG 615 are within the same communication network (e.g., share a network identifier, network keys, etc., as may be understood by those skilled in the art).

Figure 7:
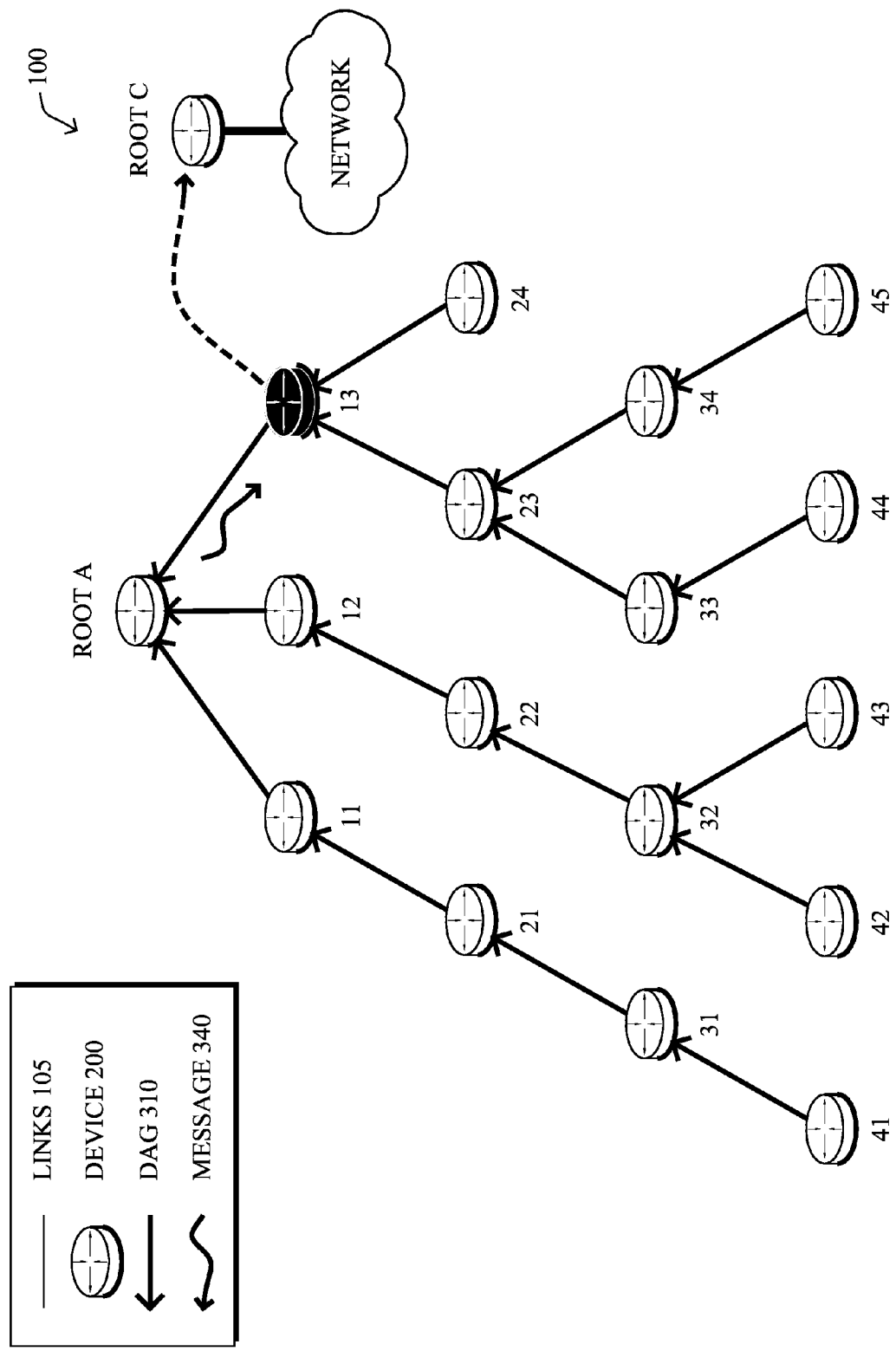
FIG. 7 illustrates an example view of detecting an alternate communication network.

Still further, as another alternative or addition to the possible search techniques above (e.g., when the first node is unable to detect an alternate route within a communication network), as illustrated in FIG. 7, the first node may search for an alternate route in an alternate communication network. In particular, as shown, the first node (e.g., node 13 in this example) may detect an alternate communication network and may trigger a switch toward the root (e.g., FAR) of that network (e.g., ROOT C) during (or in advance of) the scheduled downtime, accordingly.

In another embodiment, a plurality of the search techniques described above may be simultaneously performed in parallel. The simultaneous performance of the search techniques may be based on a time remaining until the scheduled downtime (e.g., $\Delta t$) and/or other factors, such as additional control traffic that would be generated and the capacity of the node/network to handle such traffic. That is, when additional control traffic capacity is available, the first node may incur additional control traffic by simultaneously performing multiple search techniques in parallel. For example, the first node may search for an alternate route within a DAG which the first node already participates and may also search for an alternate route in an alternate communication network at the same time.

In yet another embodiment, the first node may perform the search techniques serially. In other words, the first node may first perform a search for an alternate route using a least disruptive search technique and continue to successively more disruptive search techniques until an acceptable alternate route is detected. For example, the first node may initially search for a precalculated alternate route, and if there is no such precalculated route, may begin searching for a new one within the same DAG. In response to still not detecting an acceptable alternate route, the first node may then search for a route within an alternate DAG in which the first node already participates, prior to searching for an alternate network, and so on. Such a method of performing the search techniques serially may be performed when the duration of the scheduled downtime is equal to or greater than a predetermined length of time, to minimize routing disruption. Also, in certain embodiments, the order of performance of the techniques may be based on other factors, such as criticality of the messages from the first node (e.g., priority, type, class, etc., of the message). For example, the first node may choose to utilize a more disruptive search technique for critical messages to ensure message transmission during the scheduled downtime, but may choose to perform the plurality of search techniques serially beginning with the least disruptive technique for non-critical messages, where the messages may be delayed more than a critical message.

Moreover, once the first node has detected an alternate route to be used during a scheduled downtime using one or more search techniques, the first node may determine whether the detected alternate route complies with a service level agreement (SLA) of a traffic type to be transmitted by the first node. When the alternate route complies with the SLA, the first node may select the detected alternate route. For example, the first node may determine whether alternate next-hop routes are available and may determine whether the next-hop routes comply with a path cost increase term and/or delay requirement of the SLA. When the next-hop route (e.g., the alternate route) does not comply with the SLA, the first node may continue to search for an alternate route (e.g., may trigger a control message to search for another alternate route).

Figure 8:
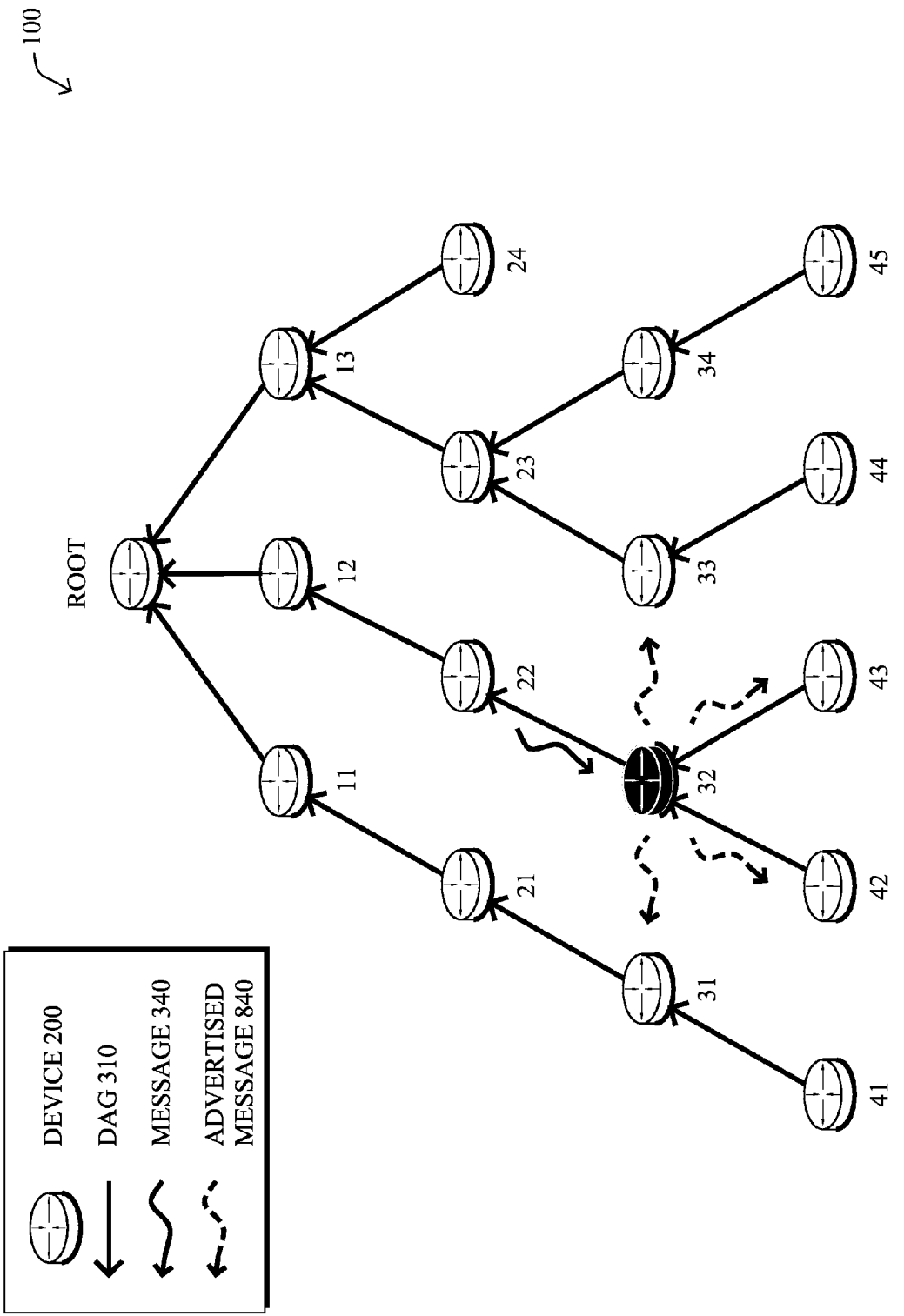
FIG. 8 illustrates an example view of advertising a scheduled downtime.

As illustrated in FIG. 8, the first node may also advertise the downtime message to neighboring nodes in the shared-media communication network to trigger the neighboring nodes to determine whether to search for alternate routes.

For instance, the first node may substantially immediately forward the advertisements 840 in response to the initial received message 340, or may forward the advertisements after the first node has performed a search for an alternate route to be used during the scheduled downtime. In particular, if waiting until after searching for its own alternate route, the messages 840 may indicate to the neighboring nodes the alternate route, or even the fact that the first node may not have a valid path toward the destination during the scheduled downtime. As a result, the neighboring nodes may decide whether to search for their own alternate routes to use during the scheduled downtime.

In yet another embodiment, the first node may receive a plurality of messages indicating scheduled downtimes of a respective plurality of nodes in the shared-media communication network (e.g., a scheduled downtime for each node). In other words, multiple downtimes may be scheduled in the communication network either occurring at the same time or at different times. Thus, in response to determining to search for an alternate route, the first node may search for an alternate route based on the corresponding plurality of scheduled downtimes. Specifically, the first node may search for an alternate route toward the destination that avoids each of the scheduled downtimes. For instance, the first node may select an alternate route for each downtime based on which nodes are available at the time, or the first node may select a single alternate route that generally avoids all of the nodes with a scheduled downtime, such as to minimize the disruption caused by multiple routing changes.

Notably, in one or more embodiments herein, the scheduled downtimes of nodes within a network may be either synchronized or non-synchronized based on, for example, network density, processing capability, etc. For instance, a message from a root (e.g., a field area router, a FAR) may indicate whether synchronization of scheduled downtimes is permitted, such as when the communication network is dense and alternate routes toward a destination may be detected despite multiple downtimes of nodes being scheduled at different times. Should multiple downtimes be scheduled at a same time where the communication network is not dense, however, synchronization may not be permitted in order to reduce topology disruption since there may not be sufficient options to create an adequate alternate route to reach the destination.

Figure 9:
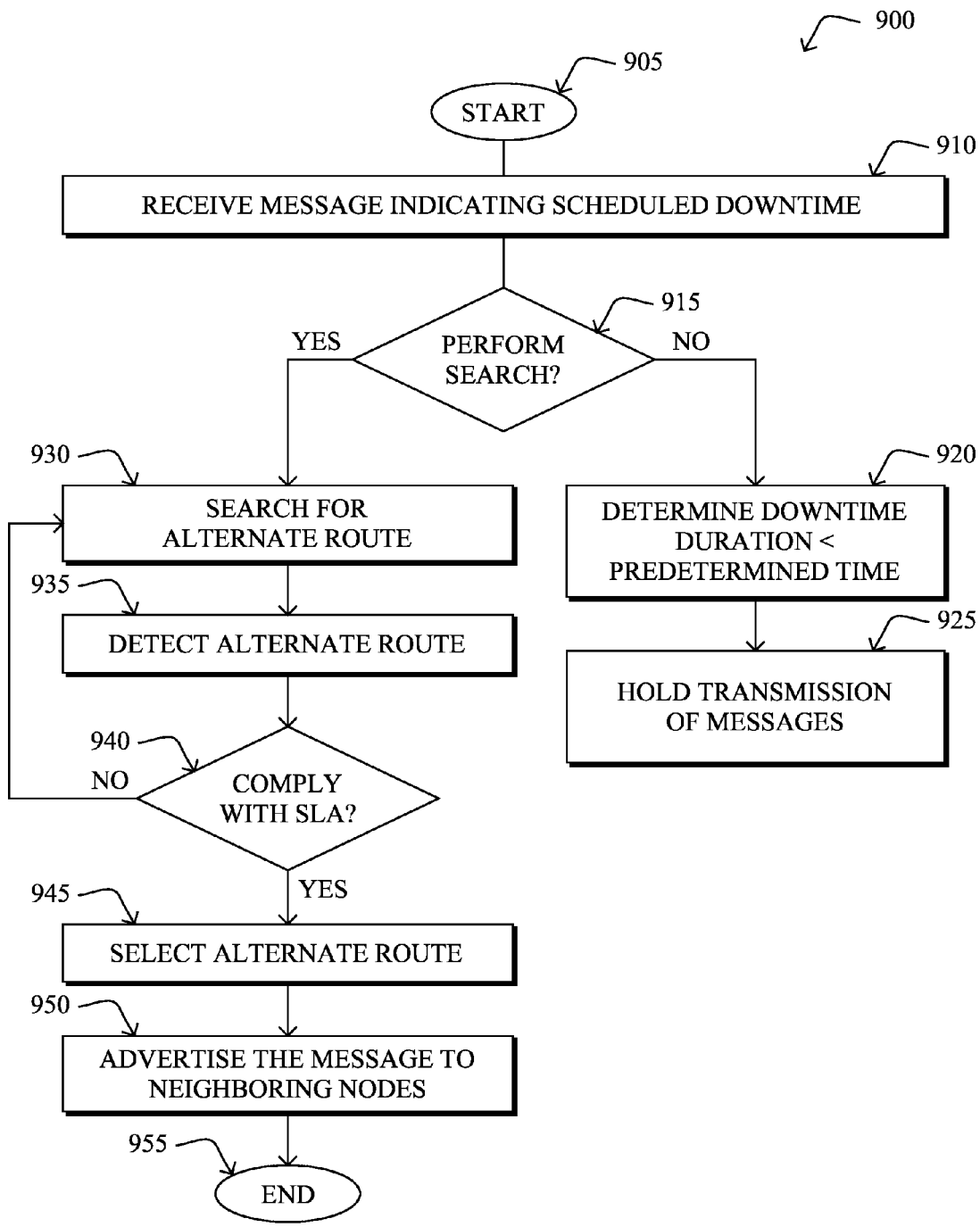
FIG. 9 illustrates an example simplified procedure for controlling routing during a scheduled downtime.

FIG. 9 illustrates an example simplified procedure for controlling routing during a scheduled downtime according to one or more embodiments described herein. The procedure 900 may start at step 905, and continues to step 910, where, as described in greater detail above, a first node may receive a message 340 indicating a scheduled downtime of a second node located between the first node and a destination. Furthermore, in step 915, the first node may determine whether to perform a search for an alternate route toward the destination (e.g., based on the factors mentioned above). In response to determining not to perform the search, such as by determining that the duration of the scheduled downtime is less than a predetermined amount of time in step 920, then in step 925, the first node may hold transmission of any messages toward the second node during the scheduled downtime. Alternatively, in response to determining to perform a search, the first node may, in step 930, perform a search for an alternate route toward the destination, illustratively using one or more of the search techniques as described above, accordingly. Once the first node has detected an alternate route in step 935, the first node may determine whether the alternate route complies with a service level agreement in step 940. In response to determining that the alternate route does not comply with the service level agreement, the first node may continue to search for alternate routes in step 930, such as by using the same search technique or a more disruptive technique. However, when the first node determines that the alternate route does comply with the service level agreement, the first node may select the alternate route in step 945, for use at least during the scheduled downtime. Notably, in step 950, the first node may also advertise the message to neighboring nodes in the shared-media communication network to trigger the neighboring nodes to determine whether to search for alternate routes. Alternatively step 950 may occur earlier within the procedure 900, such as in response to receiving the initial message 340 in step 910. The procedure illustratively ends in step 955.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for minimally disruptive routing for devices in a shared-media communication network during a scheduled downtime. In particular, the techniques herein allow for controlling a routing topology during a scheduled downtime by determining whether to search for an alternate route or to hold transmissions during the scheduled downtime. The techniques may also then trigger searching for the alternate route using a variety of searching techniques (or various disruptive levels) when a node is notified of the scheduled downtime. As such, routing disruption during a downtime may be reduced and reliability of the network may be improved.

In contrast to current techniques where a node is instructed to hold all transmissions during a scheduled downtime and buffer messages routed toward the node scheduled to incur a downtime, the techniques herein provide for the option of searching for an alternate route for use at least during the scheduled downtime in order to reduce the effect of the scheduled downtime (e.g., routing disruption), and to reduce the requirement to buffer pending transmissions during such a downtime.

While there have been shown and described illustrative embodiments that provide for controlling routing during a scheduled downtime in a shared-media communication network, it is to be understood that various other adaptations and modifications may be made within the spirit and scope of the embodiments herein. For example, the embodiments have been shown and described herein with relation to LLNs and the RPL protocol (e.g., DAGs, parent nodes, root nodes, etc.). However, the embodiments in their broader sense are not as limited, and may, in fact, be used with other types of networks and/or protocols. In addition, while the techniques herein have generally been described with relation to shared-media networks and/or protocols (e.g., wireless), wired protocols may also make use of one or more embodiments described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a first node in a directed acyclic graph (DAG) network, a message indicating a scheduled downtime of a second node located between the first node and a destination;
   determining, by the first node, whether to perform a search for an alternate route toward the destination based on information in the message, wherein the information in message includes one or more of a time of the scheduled downtime, a duration of the scheduled downtime, and a time when the message was originated, and wherein the first node determines not to perform a search for an alternate route when the duration of the scheduled downtime is less than a predetermined amount;
   in response to determining to perform the search, searching, by the first node, for an alternate route toward the destination for use at least during the scheduled downtime, wherein a searching technique utilized by the first node is chosen according to a level of disruption to the routing topology of the DAG, wherein the searching technique that minimizes the level of disruption to the routing topology of the DAG is chosen; and
   in response to determining not to perform the search, holding, by the first node, transmission of messages during the scheduled downtime.

2. The method of claim 1, wherein searching for the alternate route further comprises:
   searching for a precalculated alternate route.

3. The method of claim 1, wherein searching for the alternate route further comprises:
   searching for an alternate DAG in which the first node already participates.

4. The method of claim 1, wherein searching for the alternate route further comprises:
   searching for an alternate route in an alternate communication network.

5. The method of claim 1, wherein searching for the alternate route further comprises:
   simultaneously performing a plurality of search techniques in parallel.

6. The method of claim 5, wherein the simultaneous performance is based on at least one of a time remaining until the scheduled downtime and additional control traffic capacity.

7. The method of claim 1, wherein searching for the alternate route further comprises:
   serially selecting a search technique from a plurality of techniques based on a level of a disruption of each of the plurality of techniques until an alternate route is detected.

8. The method of claim 1, further comprising:
   determining whether a detected alternate route complies with a service level agreement of a traffic type transmitted by the first node; and
   selecting the detected alternate route in response to the detected alternate route complying with the service level agreement.

9. The method of claim 1, further comprising:
   advertising the message to neighboring nodes in the shared-media communication network to trigger the neighboring nodes to determine whether to search for alternate routes.

10. The method of claim 9, wherein the message is advertised to neighboring nodes when the search for an alternate route fails.

11. The method of claim 1, further comprising:
    receiving a plurality of messages indicating scheduled downtimes of a respective plurality of nodes in the shared-media communication network; and
    searching for one or more alternate routes based on the plurality of scheduled downtimes.

12. The method of claim 11, wherein the plurality of scheduled downtimes are either synchronized scheduled downtimes or non-synchronized scheduled downtimes.

13. The method of claim 1, wherein the second node is a parent node of the first node in a directed acyclic graph (DAG).

14. The method of claim 1, wherein the second node is a root node of a directed acyclic graph (DAG).

15. An apparatus, comprising:
    one or more network interfaces to communication with a directed acyclic graph (DAG) network;
    a processor coupled to the network interfaces and adapted to execute one or more processes; and
    a memory configured to store a process executable by the processor, the process when executed operable to:
      receive a message indicating a scheduled downtime of a second node located between the apparatus and a destination;
      determine whether to perform a search for an alternate route toward the destination based on information in the message, wherein the information in message includes one or more of a time of the scheduled downtime, a duration of the scheduled downtime, and a time when the message was originated, and wherein the first node determines not to perform a search for an alternate route when the duration of the scheduled downtime is less than a predetermined amount;
      in response to determining to perform the search, search for an alternate route toward the destination for use at least during the scheduled downtime, wherein a searching technique utilized by the first node is chosen according to a level of disruption to the routing topology, wherein the searching technique that minimizes the level of disruption to the routing topology of the DAG is chosen; and
      in response to determining not to perform the search, holding transmission of messages during the scheduled downtime.

16. The apparatus of claim 15, wherein the search includes a plurality of search techniques, the searching technique at least one of searching for a precalculated alternate route, searching for a new alternate route, searching for an alternate route within an alternate DAG in which the first node already participates, or searching for an alternate route in an alternate communication network.

17. The apparatus of claim 15, wherein the search includes a plurality of search techniques performed simultaneously in parallel.

18. The apparatus of claim 15, wherein the search includes a plurality of search techniques serially selected based on a level of a disruption of each of the plurality of techniques until an alternate route is detected.

19. The apparatus of claim 15, wherein the process when executed is further operable to:

advertise the message to neighboring nodes in the shared-media communication network to trigger the neighboring nodes to determine whether to search for alternate nodes.

20. A tangible non-transitory computer readable medium containing a process executed on a first node, wherein the process when executed is operable to:

receive a message indicating a scheduled downtime of a second node located between the first node and a destination;

determine whether to perform a search for an alternate route toward the destination based on information in the message, wherein the information in message includes one or more of a time of the scheduled downtime, a duration of the scheduled downtime, and a time when the message was originated, and wherein the first node determines not to perform a search for an alternate route when the duration of the scheduled downtime is less than a predetermined amount;

search for an alternate route toward the destination for use at least during the scheduled downtime, in response to determining to perform the search, wherein a searching technique utilized by the first node is chosen according to a level of disruption to the routing topology of directed acyclic graph (DAG) network in which the first node is communicating, wherein the searching technique that minimizes the level of disruption to the routing topology of the DAG is chosen; and in response to determining not to perform the search, holding transmission of messages during the scheduled downtime.

* * * * *